US006701046B1

(12) United States Patent
Pianciola et al.

(10) Patent No.: US 6,701,046 B1
(45) Date of Patent: Mar. 2, 2004

(54) METHOD FOR PRODUCING AN OPTICAL COUPLER FOR EXTRACTING A SIGNAL FROM A POLARIZATION MAINTAINING OPTICAL FIBER, AND CORRESPONDING COUPLER

(75) Inventors: Aurelio Pianciola, Casteggio (IT); Paolo Vavassori, Bergamo (IT); Valeria Corio, Milan (IT)

(73) Assignee: Corning O.T.I. SpA, Milan (IT)

( * ) Notice: Subject to any disclaimer, the term of this patent is extended or adjusted under 35 U.S.C. 154(b) by 18 days.

(21) Appl. No.: 10/089,780

(22) PCT Filed: Sep. 26, 2000

(86) PCT No.: PCT/EP00/09357

§ 371 (c)(1),
(2), (4) Date: Jun. 18, 2002

(87) PCT Pub. No.: WO01/23929

PCT Pub. Date: Apr. 5, 2001

Related U.S. Application Data

(60) Provisional application No. 60/158,028, filed on Dec. 20, 1999.

(30) Foreign Application Priority Data

Sep. 30, 1999 (EP) .............................................. 99119428

(51) Int. Cl.⁷ .......................... G02B 6/28; G02B 6/287; G02B 6/17; C03B 37/028
(52) U.S. Cl. ............................. 385/43; 385/11; 385/42; 385/51; 65/384; 65/411
(58) Field of Search ................................. 385/11, 42, 43, 385/50, 51; 65/408, 411, 378, 384

(56) References Cited

U.S. PATENT DOCUMENTS

| 4,801,185 A | * | 1/1989 | Bricheno ..................... 385/42 |
| 5,064,267 A | * | 11/1991 | Rossberg ..................... 385/50 |
| 5,224,977 A | | 7/1993 | Anjan et al. ................. 65/4.21 |
| 5,293,440 A | | 3/1994 | Miles et al. .................. 385/51 |
| 6,148,129 A | * | 11/2000 | Pan et al. ..................... 385/42 |

FOREIGN PATENT DOCUMENTS

WO WO9834138 A 8/1998

OTHER PUBLICATIONS

"Polarization Properties of Fused Fiber Couplers and Polarizing Beamsplitters" Journal of Lightwave Technology Nov. 1991, vol. 11, 9 p. 1503–1507.

* cited by examiner

Primary Examiner—Hemang Sanghavi
Assistant Examiner—Omar Rojas
(74) Attorney, Agent, or Firm—Walter M. Douglas

(57) ABSTRACT

A fused optical coupler comprising a polarization maintaining fiber and a standard fiber is provided. The cross-section of the said standard fiber is smaller than the cross-section of the polarization maintaining fiber in the area of fusion of the coupler. The internal forces in the coupling area are sufficiently low to provide an extinction ratio of more than 20 dB at the output of the polarization maintaining fiber.

10 Claims, 6 Drawing Sheets

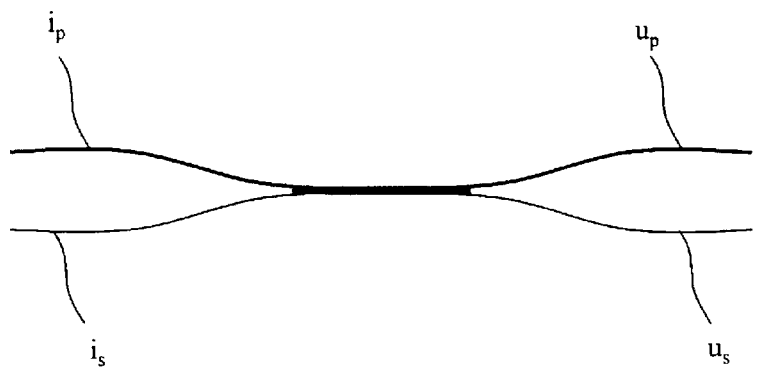
- Fig. 1 -
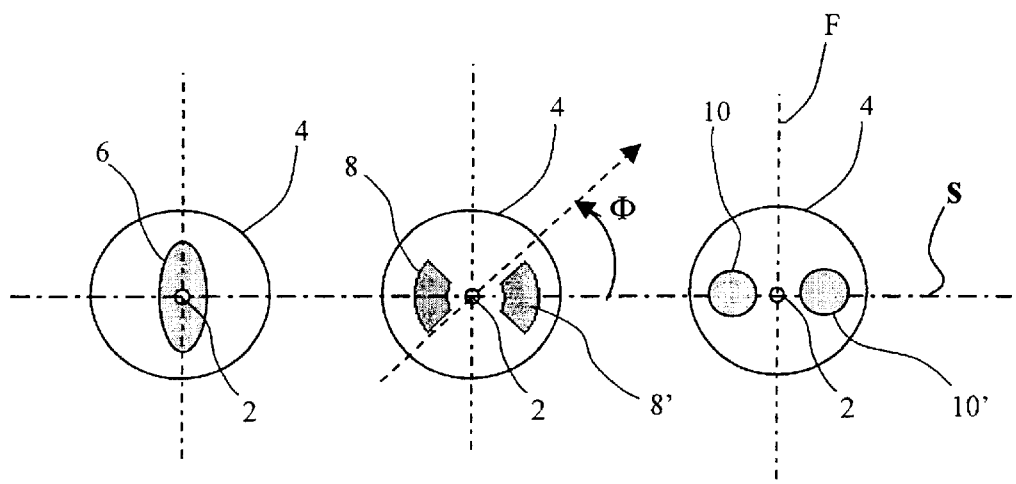
Fig. 2a  Fig. 2b  Fig. 2c

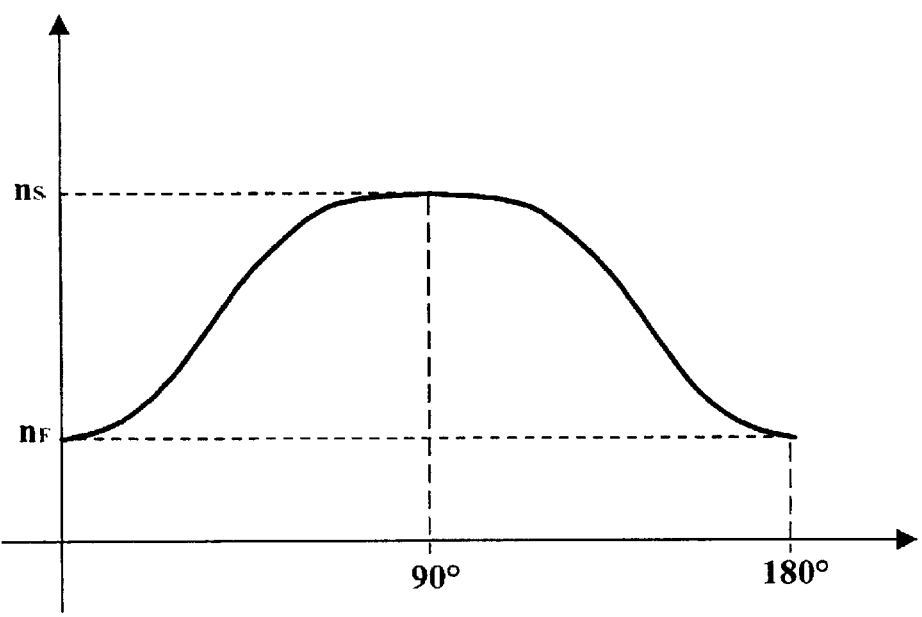
- Fig. 3 -
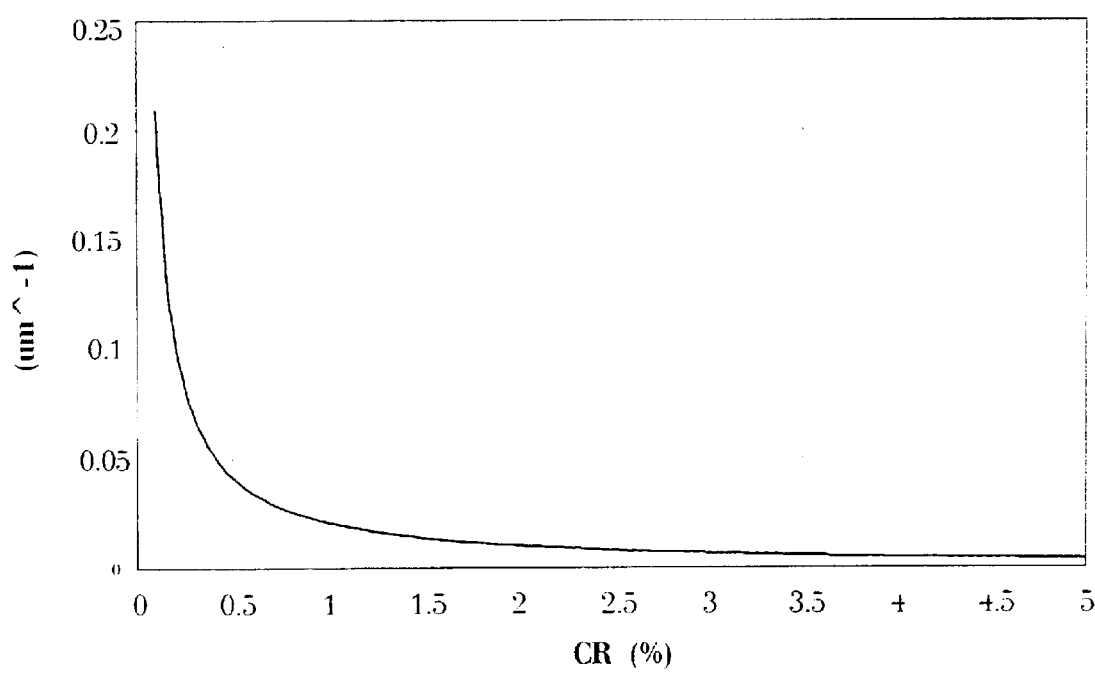
- Fig. 4 -

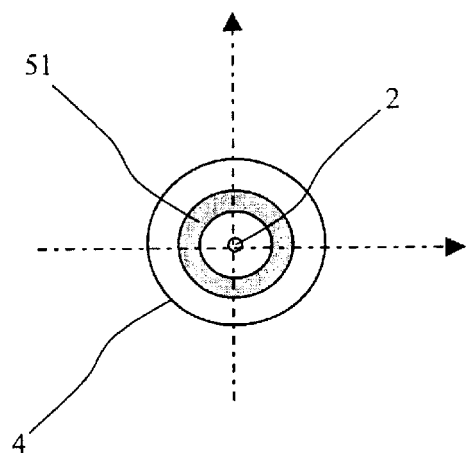
Fig. 5
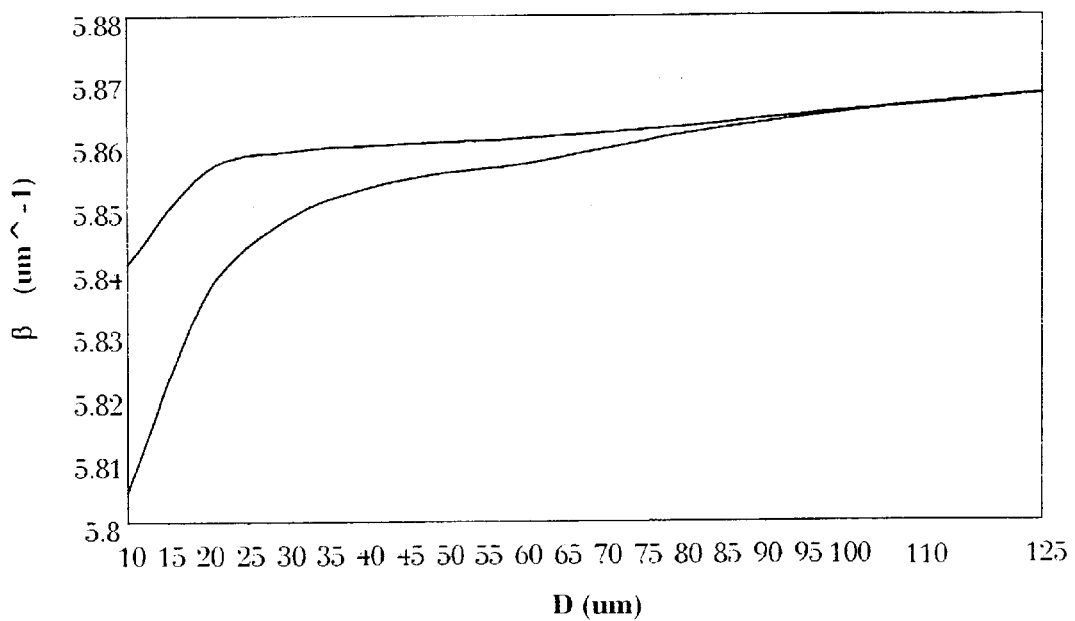
- Fig. 6 -

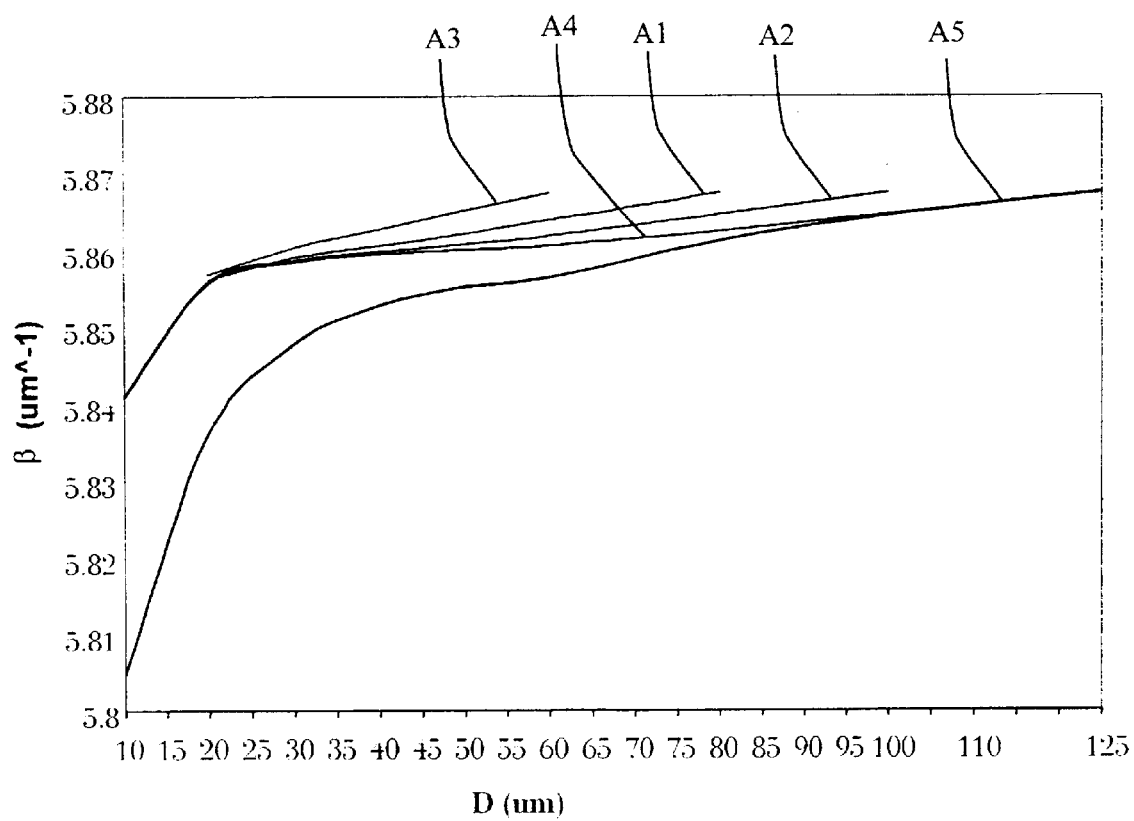
- Fig. 7 -

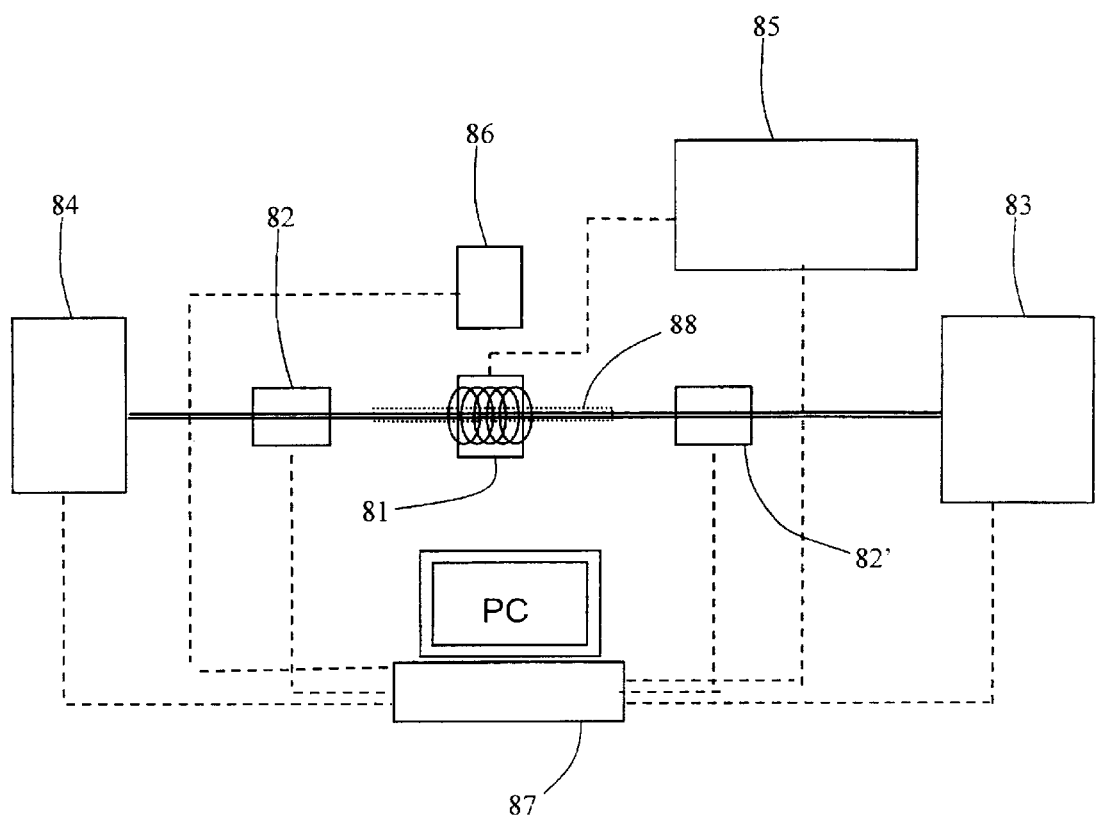
- Fig. 8 -

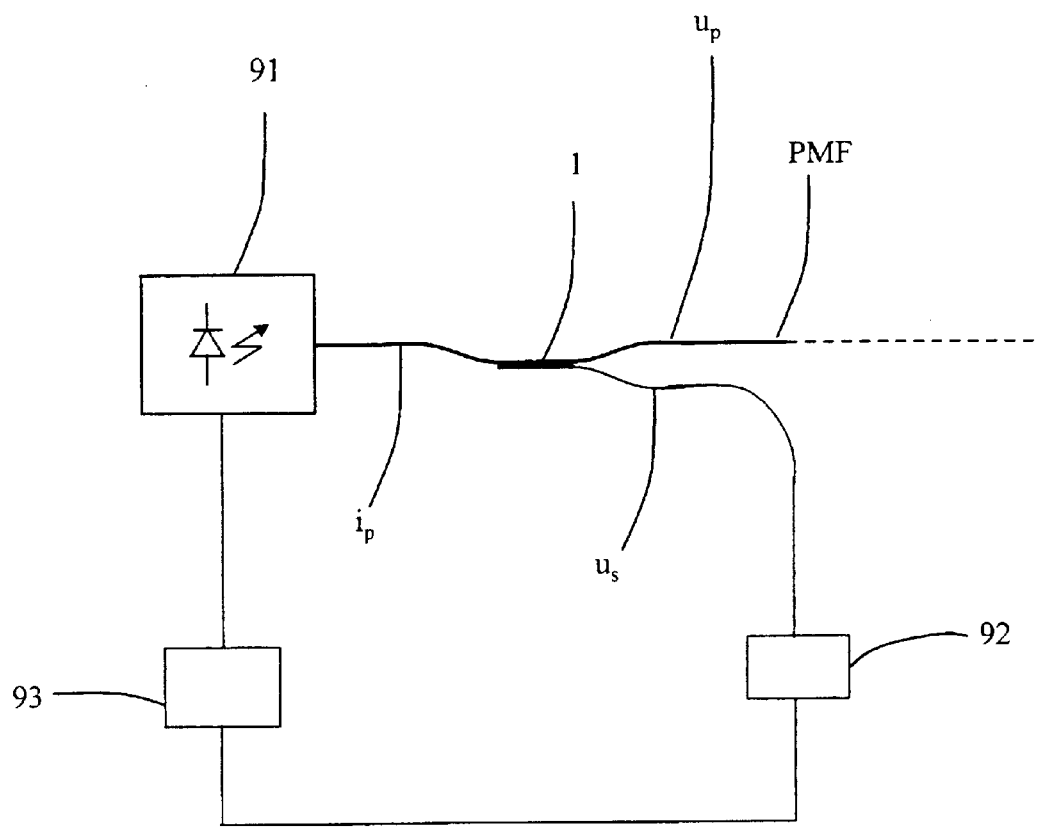
- Fig. 9 -

METHOD FOR PRODUCING AN OPTICAL COUPLER FOR EXTRACTING A SIGNAL FROM A POLARIZATION MAINTAINING OPTICAL FIBER, AND CORRESPONDING COUPLER

This application claims benefit of S. No. 60/158,028 filed Dec. 20, 1999.

BACKGROUND OF THE INVENTION

The present invention relates to a method for producing an optical coupler and/or an optical splitter between a polarization maintaining optical fibre and an optical fibre which is not polarization maintaining, and a corresponding optical coupler and/or splitter.

Polarization maintaining fibres (PMF) are characterized in that they retain the polarization of the input signal within them throughout their length, if this polarization is orientated in one of the two polarization directions of the fibre.

In particular, these fibres have two principal axes of propagation of the optical signal within them (axes of birefringence), called the slow axis and the fast axis. The said axes are essentially perpendicular to each other and have different characteristics. The fast axis has an effective refractive index which is considerably lower than that of the slow axis, and therefore allows the light beam polarized in the same direction to travel along the fibre at a higher phase velocity than that of the optical beam polarized in the direction of the slow axis. In both directions, however, the output signal from the fibre is kept essentially unaltered. A polarization maintaining fibre is characterized in that it has a difference of more than $10^{-4}$ between the refractive indices between the two axes of birefringence.

For the purposes of the present invention, the term "standard fibre" denotes an optical fibre which is not polarization maintaining. Preferably, the said standard fibre is a single-mode fibre, particularly a step-index optical fibre.

In particular, in a coupler according to the present invention, an optical signal which passes along a polarization maintaining fibre ("principal fibre") is partially extracted from the said fibre and injected into a standard fibre ("extraction fibre"). This coupler can be used in applications which do not require a defined polarization state in the extracted signal.

A typical application of this coupler is the monitoring of the optical power carried by a polarization maintaining fibre in which the power measurement is carried out by means of a polarization-insensitive photodetector which is directly connected to the extraction fibre.

More generally, the monitoring of the optical power is carried out by means of any apparatus which does not require the use of any component characterized by a polarization-dependent behaviour. Conversely, in this application, the output signal from the principal fibre must have a polarization state which is nominally identical to that of the input to the fibre.

An optical signal transmitted by a polarization maintaining fibre is characterized not only by the optical power associated with it, but also by the extinction ratio of the polarization, which quantifies the degradation of the state of polarization with respect to that which should theoretically be propagated. In the case of nominally linear polarization, the extinction ratio is defined thus:

$$ER = \frac{P_C}{P_N} \quad (1)$$

where:
- $P_C$ is the optical power associated with the axis of birefringence of the fibre along which the optical signal is sent, called the co-polarized component of the optical signal;
- $P_N$ is the optical power associated with the axis of birefringence of the fibre along which the optical signal is not sent, called the cross-polarized component (theoretically zero).

At the input of the polarization maintaining fibre, the said ratio is infinite, since all the optical power is injected along an axis of birefringence. Subsequently, a small part of the optical power is transferred along the other axis of birefringence, as a result of a possible degradation of the fibre, and consequently the extinction ratio assumes a finite value.

A technology which can be used to produce a coupler and/or splitter between a polarization maintaining fibre and a standard fibre is that of micro-optics.

Splitters made by this technology are marketed, for example, by JDS (Nepean. ON, Canada), E-Tek (San José, Calif., USA) and Micro-Optics (Hackettstown, N.J., USA). With this technology, the principal fibre and the extraction fibre are both terminated with suitable lenses to form collimators between which an optical power divider element is inserted on each of the two fibres.

In these splitters, one of the two fibres may be a standard fibre, and therefore by suitably selecting the splitting ratio, or the coupling ratio (CR) of the optical power divider element inserted between the collimators, it is possible to extract a portion of the signal from the polarization maintaining fibre and to send it along the standard fibre.

The Applicant has observed that the coupling efficiency between collimated beams associated with different fibres (such as polarization maintaining fibres and standard fibres) is less than 100%, and the achieving of relatively low losses for a component made by micro-optics technology makes the assembly difficult and expensive.

There are also known optical couplers and/or splitters between polarization maintaining fibres produced by the fusion technology, in other words optical couplers and/or splitters in which both the principal fibre and the extraction fibre are polarization maintaining optical fibres. A component of this type is used in all applications in which polarization maintaining division of optical power is desired (the extraction fibre also maintains the polarization).

U.S. Pat. No. 5,224,977 describes an apparatus for producing a fused optical coupler between polarization maintaining fibres. The apparatus comprises. in particular, a first polarization maintaining fibre and a second polarization maintaining fibre, means for holding stripped portions of both of the said fibres in a position of mutual alignment and in contact with each other. The apparatus also comprises means for heating the said portions of both fibres, placed adjacent to the said means for holding stripped portions of both of the said fibres. The said means for heating the portions of both fibres oscillate along the said stripped portions with an amplitude decreasing in steps until the fusion of the said two portions is complete.

The essential aspect which distinguishes the production of a fused optical coupler between polarization maintaining fibres from the production of a similar splitter with standard fibres is that, in the first case, the polarization is desired to be maintained in both of the maintaining fibres. It is therefore necessary to use a method which ensures that the two fibres in the coupling area are fused while maintaining the parallel orientation of the axes of birefringence. The Applicant has observed that this method applied to a coupler considerably complicates the process of fabricating the coupler by comparison with the process used in the case of standard fibres; this is because these methods require the pre-alignment of the axes of birefringence of the fibres, visually or by monitoring the polarization state at the output of the fibres, before fusion is initiated; this complication is manifested in a considerably longer operating time than that required to produce couplers and/or splitters between standard fibres, and in a considerably lower efficiency of the process. These couplers are therefore expensive.

The Applicant has tackled the problem of producing couplers between a polarization maintaining fibre and a standard fibre with a simpler and relatively inexpensive technology. The Applicant has observed, however, that a fusion process of the standard type does not permit coupling between a polarization maintaining fibre and a standard fibre.

U.S. Pat. No. 5,293,440 describes a coupler for polarization maintaining fibres produced by the fusion technology, including a rigid substrate and two optical fibres placed adjacent to each other and joined together in their portions in which the coupling takes place.

Each optical fibre is fixed separately by an adhesive to the rigid substrate at each of its ends. The coupling portion of the two fibres can be formed by fusion or any other method of joining the two fibres together. The optical fibres of the coupler can be polarization maintaining fibres, single-mode optical fibres, multimode optical fibres. or their combinations. In one embodiment in this patent, a coupler called a hybrid coupler is described, in which coupling takes place between a polarization maintaining fibre and a single-mode optical fibre.

The Applicant has observed that, according to the aforesaid patent, even in a fusion coupler between a polarization maintaining fibre and a standard fibre, one of the axes of birefringence of the polarization maintaining fibre has to be aligned with the geometrical axis of the coupler, defined as the axis passing through the centres of the two fibres.

The Applicant has tackled the problem of the difference between the propagation constants of the two optical fibres fused together, where one is a polarization maintaining fibre and one is a standard fibre, which varies according to the value of the angle between the geometrical ads of the coupler and one of the two axes of birefringence of the polarization maintaining fibre.

The Applicant has found a method which can be used to produce an optical. coupler/splitter between a polarization maintaining fibre and a standard fibre by the fused fibre technology, used in the case of "standard" fibres, using a process which does not require the alignment of one of the axes of birefringence of the polarization maintaining fibre with the geometrical axis of the coupler, but which still makes it possible to establish an optimal condition of optical coupling between the fused fibres.

In particular, the Applicant has discovered that, by tapering the "standard" fibre before fusion, by suitably selecting the extent of the pre-tapering and then tapering both fibres together during the stage of fusion at a predetermined fusion temperature, it is possible to ensure that the relative cross sections in the coupling area are such that the coupling condition is achieved and that the extinction ratio is greater than 20 dB at the output of the polarization maintaining fibre.

The method according to the present invention makes it possible to dispense with the procedure of rotational alignment of the axes of birefringence of the polarization maintaining fibre with the geometrical axis of the coupler; it is therefore a particularly convenient method in terns of simplicity, efficiency and performance obtainable from the completed device.

BRIEF SUMMARY OF THE INVENTION

In a first aspect, the present invention relates to a method for producing a fused coupler, comprising a polarization maintaining fibre and a standard fibre, comprising the following stages:

reducing the cross section of the standard fibre in such a way as to obtain a propagation constant for the standard fibre which differs from a propagation constant of the polarization maintaining fibre by less than a predetermined quantity corresponding to a condition permitting coupling between the fibres;

bringing the two fibres into contact with each other;

tapering the two fibres together and fusing a portion of each fibre, in a region where the two fibres are in contact with each other, at a fusion temperature which is higher than a predetermined temperature, where this predetermined temperature is such as to provide an extinction ratio of at least 20 dB at the output of the polarization maintaining fibre In case of a linear polarization at the input of the polarization maintaining fibre.

Preferably, the stage of reducing the cross section of the standard fibre comprises the stage of reducing the diameter of the said fibre.

In particular, the stage of reducing the standard fibre comprises the stage of tapering the said fibre by elongation.

Alternatively, the stage of reducing the standard fibre comprises the stage of reducing the diameter of the cladding while keeping that of the core unchanged.

Preferably, the said predetermined temperature is 1610° C.

Preferably, the said fusion temperature is lower than 1650° C.

In particular, the said propagation constant for the standard fibre differs from the propagation constant of the polarization maintaining fibre by less than a predetermined quantity corresponding to a coupling ratio of 1%.

In a further aspect, the present invention relates to a fused optical coupler comprising a polarization maintaining fibre and a standard fibre, wherein the cross section of the said standard fibre is smaller than the cross section of the polarization maintaining fibre in the area of fusion of the coupler in such a way as to obtain a propagation constant for the standard fibre which differs from a propagation constant of the polarization maintaining fibre by less than a predetermined quantity corresponding to a condition permitting coupling between the fibres, and the internal forces in the coupling area are sufficiently low to provide an extinction ratio of more than 20 dB at the output of the polarization maintaining fibre in case of a linear polarization at the input of the polarization maintaining fibre.

BRIEF DESCRIPTION OF THE SEVERAL VIEWS OF THE DRAWINGS

Further characteristics and advantages of the present invention can be found in greater detail in the following description, with reference to the attached drawings, provided solely for the purposes of explanation and without any limiting intent, which show:

in FIG. 1, a fused optical coupler between a section of a polarization maintaining fibre and a section of a standard fibre;

in FIGS. 2a, 2b and 2c, three examples of types of polarization maintaining fibre, shown in cross section;

in FIG. 3, a graph of the effective refractive index of a polarization maintaining fibre as a function of the angle φ shown in FIG. 2b;

in FIG. 4, a graph which relates the differences of the propagation constants of two fibres to the percentage of optical coupling obtainable for a typical coupler with a drawing length of 12 mm;

in FIG. 5, a model of optical fibre with a circular sector having a different refractive index;

in FIG. 6, a graph of the propagation constant for a polarization maintaining fibre and for a standard fibre as a function of their diameter;

in FIG. 7, a graph of the propagation constant for a polarization maintaining fibre and a graph of a propagation constant for a standard fibre, for different diameters of the standard fibre;

in FIG. 8, an experimental apparatus with which fusion is carried out;

in FIG. 9, an application of an optical coupler between a polarization maintaining fibre and a standard fibre according to the present invention.

DETAILED DESCRIPTION OF THE INVENTION

With reference to the aforesaid figures, a method will now be described for producing a fused optical coupler between a section of a polarization maintaining fibre and a section of a standard fibre.

This coupler, illustrated in FIG. 1, preferably comprises a first input $i_p$, corresponding to one end of the said section of polarization maintaining fibre, a second input $i_s$, corresponding to one end of the said section of standard fibre, a first output $u_p$, corresponding to the opposite end of the said section of polarization maintaining fibre, and a second output $u_s$, corresponding to the opposite end of the said section of standard fibre. In the intermediate area, the two fibres are wound around each other or placed adjacent to each other over a predetermined length in such a way as to maintain the contact between them, and fused by a known fusion process used to form couplers between standard fibres.

An optical signal, polarized along an axis of birefringence of the polarization maintaining fibre, and injected into the input $i_p$ of the said fibre, exits partially from the first output $u_p$ and partially from the second output $u_s$ according to a distribution of the optical power of the transmitted polarized optical signal depending on a coupling ratio which is fixed during the production of the coupler.

Additionally, the optical signal collected at the output $u_p$ of the polarization maintaining fibre has a polarization extinction ratio essentially equal to that of the input signal; in other words, the polarization of the input signal is kept in its original form. At the output $u_s$ of the standard fibre, the optical signal has a random polarization.

For the purposes of the present invention, it is specified that a coupler between a polarization maintaining fibre and a standard fibre maintains the polarization when the measured polarization extinction ratio at the output of the polarization maintaining fibre is greater than 20 dB.

Similarly, an optical signal injected into the input $i_s$ is divided between the output $u_s$ and the output $u_p$ according to a coupling ratio which is inverted with respect to the case in which the signal is injected at the input $i_p$. When the signal is injected at the input $i_s$, the polarization will be random at both outputs.

In one embodiment, the coupler may have no second input $i_s$; in this embodiment, an optical signal sent to the single input $i_p$ is divided between the two outputs as in the preceding embodiment.

FIGS. 2a, 2b and 2c show three known types of polarization maintaining fibre, namely a polarization maintaining fibre with elliptical cladding in FIG. 2a, a polarization maintaining fibre with tensioning members with annular cross section ("bow-tie") in FIG. 2b and a polarization maintaining fibre with circular tensioning members (Panda™) in FIG. 2c.

In all three illustrated types of optical fibres, there is a core 2, a cladding 4, and at least one region with glass having physical characteristics different from those of the core and cladding, and in particular having a different refractive index. In the fibre in FIG. 2a, this region comprises an elliptical cladding 6; in the fibre in FIG. 2b this region comprises a pair of annular sectors 8 and 8' which are approximately opposite each other; and in FIG. 2c this region comprises a pair of circular elements 10 and 10' which arc approximately opposite each other.

The tensioning members have a different refractive index from the core 2 and the cladding 4. Additionally, this region (the elliptical cladding in FIG. 2a and the tensioning members in the other two figures) has a non-circular symmetry and this creates a non-constant distribution of the effective refractive index n of the fibre as a whole, in other words of the refractive index as it affects an optical signal sent into the fibre. This non-circular symmetry makes it possible to obtain the aforesaid two preferential linear axes of propagation (in other words the axes of birefringence). The slow axis of birefringence S for the fibres arranged as in these figures is the horizontal axis, and the fast axis of birefringence F is the vertical axis. This non-circular symmetry is manifested in the graph in FIG. 3. which shows the variation of the effective refractive index of a polarization maintaining fibre as a function of the polarization angle φ shown in FIG. 2b. The refractive index in the direction of the axis of birefringence is identified, respectively, as $n_f$ for the fast axis and $n_s$ for the slow axis. These indices are, respectively, the minimum and maximum values of the refractive index in the fibre. In general, the refractive index has a non-linear variation, due to the form of the regions having a different refractive index.

The propagation constant of an optical fibre β is defined thus:

$$\beta = \frac{2\pi}{\lambda} \cdot n_e$$

where $n_e$ is the effective refractive index of the fibre and λ is the wavelength of the optical signal sent into the fibre.

A polarization maintaining fibre as described above has a propagation constant which is variable as a function of the orientation of the fibre with respect to the polarization of the incident optical signal.

In a fused coupler, the coupling condition between the two optical fibres which form the coupler depends on the propagation constants in these fibres; if the difference between the two propagation constants remains within a specified value, which can be calculated according to the fusion parameters of the coupler, the signals which travel in the two fibres are matchable according to a specified coupling ratio. The coupling ratio CR varies not only according to the propagation constants of the two fibres, but also according to the length of the fusion area and the cross section of the fibres in the area which is elongated during the fusion process.

For the purposes of the present invention, it is specified that the coupling condition in a fused coupler is achieved when the difference Δ between two propagation constants of the fibres which form the coupler is such as to provide a coupling ratio sufficient to permit effective detection of the signal extracted from the standard fibre.

In practice, the coupling ratio must be at least 1% in most cases. For example, as shown in the graph in FIG. 4 which shows the difference between the propagation constants of two fibres corresponding to the percentage of optical coupling CR obtainable for a typical coupler with a drawing length of 12 mm, the value Δ corresponding to a CR of 1% is approximately 0.022 $\mu m^{-1}$. Preferably, the coupling ratio is greater than 2%.

The drawing or traction length is the length by which the two fibres forming the coupler are elongated together.

The polarization maintaining fibre and the standard fibre are called "matchable" when the difference between their propagation constants, at the wavelengths specified for the operation of the coupler, is sufficiently low to reach a coupling condition, as defined above, for the coupler.

When the preceding condition between the two propagation constants of the two fibres is met, the optical signal sent into an input of the coupler in the area in which the two fibres are fused together is partially exchanged between the two fibres.

It is also necessary to make the two propagation constants similar in a fused optical coupler between a polarization maintaining fibre and a standard fibre, in order to enable the coupling condition between the two fibres to be met.

For the polarization maintaining fibre, as stated above, the propagation constant varies as a function of the orientation of the fibre with respect to the polarization of the optical signal; the propagation constant which differs most from that of a standard fibre is that which is directed along the slow axis of the said fibre. It is therefore necessary to consider that the coupling condition between the fibres will not be equivalent for each polarization, and therefore the optical signal at the input of the polarization maintaining fibre must have a predetermined polarization; typically, but not exclusively, the polarization maintaining fibre is used for the propagation of an optical signal along the slow axis.

To analyse the propagation constants of the standard and polarization maintaining fibres and the variation of these propagation constants during the fusion process, the Applicant used the following procedure: for the standard fibre, a simulator for fibres with circular symmetry was used, enabling the propagation constant to be calculated for a standard fibre with different cross sections from 125 $\mu$m to 10 $\mu$m, while keeping the core/cladding ratio unchanged; this corresponds to calculating the variation of the propagation constant for a decreasing diameter of the fibre.

The simulator was then applied to a model of a fibre, shown in FIG. 5, in which the regions with a different refractive index, shown in the fibre in FIG. 2b ("bow-tie" fibre), which determine the axes of birefringence of the fibre, have been extended over a circular ring 51. Thus, the model represents a fibre in which the effective refractive index corresponds to that of a polarization maintaining fibre along the slow axis, for direct polarization along any axis in the cross section of the fibre. Thus, the Applicant always analysed the worst coupling condition between a polarization maintaining fibre and a standard fibre.

The result of the simulation is shown in FIG. 6, in which the curves represent the propagation constants β of the polarization maintaining fibre (lower curve) and of the standard fibre (upper curve) as a function of their diameter D; the Applicant has observed that the difference between the two propagation constants, in the area in which the cross sections of the fibres assume typical values (for example 10–20 $\mu$m) for which coupling can take place between the fibres, is greater than the maximum difference indicated in the graph in FIG. 4. This difference, therefore, is not sufficient to provide the coupling condition required to produce a fused coupler.

The Applicant has discovered that a method for decreasing this difference between the propagation constants is that of pre-tapering the standard fibre.

For the purposes of the present invention, the term "pre-tapering" denotes a decrease of the cross section, preferably of the diameter, of an optical fibre while keeping the dimensional ratio of the core to the cladding unchanged.

The effect of the pre-tapering of the standard fibre can be seen in the graph in FIG. 6 where the curve for the standard fibre is shifted to the right by an amount equal to that obtained from the difference between the initial cross section of this fibre and the cross section found at the end of the pre-tapering process.

For example, for the model in FIG. 5, the coupling condition is obtained for a coupler in which the maintaining fibre has a diameter of 125 $\mu$m with a pre-tapering of the "standard" fibre in such a way that its cross section is reduced from 125 $\mu$m to approximately 100 $\mu$m.

By suitable selection of the extent of pre-tapering, it is possible to taper both fibres successively and to make the relative cross sections in the coupling area such that the previously defined coupling condition is present. In particular, a pre-tapering in the range from 15% to 40%, and preferably 20%, of the diameter makes it possible to achieve the coupling condition in a coupler having this drawing length.

An alternative procedure to pre-elongation capable of providing the coupling condition is that of modifying the external diameter of the standard fibre, by chemical erosion for example; in this case, the core/cladding ratio is not conserved as it is in the procedure described previously. However, when observing the curves of the graph in FIG. 7, in which the variation of the propagation constant of the polarization maintaining fibre is shown according to the model in FIG. 5 during the tapering compared to that obtainable in a standard fibre which is tapered, and considering different cases in which the cladding was reduced in advance, the Applicant has noted that there is a value of reduction of the cladding which can result in a coupling condition in the relevant area for the coupler.

For example, the curve of reduction of the external diameter to values in the range from 80 $\mu$m (curve A1 in FIG. 7) and 100 $\mu$m (curve A2 in FIG. 7) can provide an adequate matching between the propagation constants. The remaining curves represent the propagation constant for a reduction of diameter to 60 $\mu$m (curve A3), for a standard fibre (curve A4) and for a polarization maintaining fibre (curve A5).

The Applicant conducted an experiment in order to verify that the method according to the present invention provided a coupler between a polarization maintaining fibre and a standard fibre in which the coupling condition was achieved and in which the degradation of the extinction ratio caused by the effects of interpenetration of the fibres was minimized.

The apparatus used both for the pre-tapering of the standard fibres and for the fusion of the coupler is shown schematically in FIG. 8, and comprises a micro-furnace 81 in which the polarization maintaining fibre and the standard fibre are fused, a pair of motors 82 and 82' to carry out both the pre-elongation of the standard fibre and the subsequent elongation of both fibres, a source 83 for injecting an optical signal into the said fibres and an optical signal detector 84. The apparatus also comprises a radio-frequency generator 85 for heating the micro-furnace and a pyrometer 86 for measuring the temperature on the exterior of the micro-furnace. Both the fusion process and the pre-elongation process are controlled by a computer 87.

The fusion is carried out by the platinum micro-furnace 81 which is heated by induction; the length of the micro-furnace is 13 mm, and the fibres are fused, within a quartz tube 88 which is inserted in the micro-furnace in order to provide a greater concentration of heat in the central area, and which has an external diameter of 2 mm, an internal diameter of 1 mm and a length of 40 mm. At the end of the process, this tube is used as the support for fixing the fibres with epoxy resin; in addition, the active monitoring system measures the optical power exchanged between the fibres and the extinction ratio in the polarization maintaining fibre.

In the initial phase, only the standard fibre (a Corning SMF-28 fibre was used for the experiment), previously stripped of its acrylate coating over a length of 35 mm, was inserted and fixed to the motors 82 and 82' in order to carry out the process of its pre-tapering.

The polarization maintaining fibre (a Fujikura SM15-0-8/125-UV/UV-250 PANDA fibre), previously stripped of its acrylate coating over a length of 40 mm, was then wound around the standard fibre to provide a physical contact between the fibres.

The following table shows the maximum coupling values obtainable with the apparatus described above, in which the polarization maintaining fibre and the standard fibre were fused by a conventional process for forming couplers with standard fibres, after the standard fibre had been pre-elongated (in order to create the pre-tapering) with different values of pre-elongation (corresponding, therefore, to different values of core cross section obtained).

In particular, the table shows the temperature at which the fusion was carried out, the extent of pre-elongation of the standard fibre in mm, the traction length L of the portion of fused fibres in mm, and the coupling ratio CR obtained.

| PRE-ELONGATION (mm) | 2 | 3 | 4 | 6 | 7 | 9 |
|---|---|---|---|---|---|---|
| TEMPERATURE (° C.) | 1400 | 1400 | 1400 | 1400 | 1400 | 1400 |
| L (mm) | 14.5 | 17.7 | 14.9 | 18.9 | 16.9 | 17.2 |
| CR (%) | 0.01 | 0.01 | 0.7 | 5.9 | 5.9 | 4.2 |

The table shows that it is possible to identify an optimal value of pre-elongation (approximately 6–7 mm) for which there is maximum coupling between the fibres. In particular, this pre-elongation is effective in a range from 5 to 9 mm.

In the experiment, the Applicant verified that, when the orientation of the polarization maintaining fibre was controlled, the worst case of the direction of the stresses is present, in respect of the polarization extinction ratio, when the slow axis of the polarization maintaining fibre is aligned with the geometrical axis of the coupler.

The experiment also showed that there is a degradation of the extinction ratio when use is made of the thermal and elongation profiles shown in the table, which are similar to those used for couplers of the standard type. The degradation of the extinction ratio, which is actively monitored during the fusion, was found to be increasingly progressive and rapid as the section of the coupler decreased, descending to unacceptable values (<10–15 dB) just when the coupling began to reach acceptable levels.

The Applicant has hypothesized that the force associated with the interpenetration of the fibres which is established during the fusion process, being directed in a random way with respect to the axes of birefringence, can also drastically modify the characteristics of birefringence of the maintaining fibre, thus degrading the extinction ratio in the polarization maintaining fibre at the output of the coupler.

To overcome this problem, various tests were conducted with different thermal and elongation profiles in order to identify a group of profiles which, by providing higher degrees of fusion than in the process used for standard couplers, make it possible to have a higher degree of softening of the fibres. Extinction ratios of more than 23 dB at the end of fusion were obtained with this method. According to the Applicant, these results are due to the reduction of the force associated with the interpenetration, which is associated with the greater softening.

In one experiment, conducted with the same type of fibres and in the same conditions as those described above, the tapering was obtained by bringing the micro-furnace to 1560° C. and elongating the fibre at the velocity of 55 $\mu$m/s, after a stage of pre-fusion with a duration of 30 s at zero velocity. During the process, the optical power at the output of the fibre was monitored constantly to verify that there were no power losses (in other words, it was ensured that the tapering took place in an adiabatic way). The fusion and elongation process was interrupted after an elongation of 8 mm.

At this point, a new fusion and elongation process was started to produce the coupler; the temperature of the micro-furnace was raised to 1630° C., and then a pre-fusion with a duration of 30 s was carried out at zero velocity; the elongation stage was then started and was carried out at the velocity of 46.4 $\mu$m/s. During the elongation, the optical power at the output of both fibres and the extinction ratio at the output of the PANDA fibre were constantly monitored by means of the optical signal detector 84. The process was stopped when the coupling had reached 5%.

The optical characteristics of the finished coupler, measured after fixing to the quartz tube by injecting a signal at 1550 nm polarized linearly along the slow axis of the fibre into the PANDA fibre, were as follows:

Coupling ratio: 6.3%

Excess loss: 0.6 dB

Extinction ratio: 24 dB

The Applicant has noted that the described method eliminates any process of rotational alignment of the axes of birefringence of the polarization maintaining fibre with the geometrical axis of the coupler. The parallel arrangement of the two fibres in the fusion area may be accompanied with an orientation of the axes of birefringence with respect to the positioning axis of the fibres (in other words, an angle $\phi$ as shown in FIG. 2b) which is entirely random; this effect is not reflected in the final performance of the coupler which is obtained.

The Applicant has found a series of thermal and elongation profiles which make it possible to obtain an extinction ratio of more than 20 dB at the end of the fusion. In particular, the said thermal and elongation profiles provide for the fusion of the fibres at a temperature in the range from 1610° C. to 1650° C. for a period of not less than 30 s, during which the fibres are elongated by at least 6 mm.

A possible application of an optical coupler between a polarization maintaining fibre and a standard fibre will now be described.

FIG. 9 shows a diagram representing a device for stabilizing the wavelength emission of a laser 91. The device comprises a coupler 1 of the type according to the present invention, a wavelength detector 92 of a known type and an electronic control card 93. The coupler 1 extracts a fraction of the optical power emitted by the wavelength laser 91 and sends it to the wavelength detector 92. The said detector sends an electrical signal which detects any deviation of the wavelength of the extracted signal with respect to the nominal emission wavelength of the laser. The electronic card 93 processes this signal and sends a signal for correcting the wavelength emitted by the laser. In the example described, the laser is a DFB (distributed. feedback) FLD5F6CX-HXX model, produced by Fujitsu. A laser of this type is used as the signal laser for multiple-wavelength optical telecommunications systems. The emission wavelength of the laser has to be stabilized in these applications, since the channels are centred according to the ITU-T grid and the tolerance of this type of laser is ±100 pm. This value represents the deviation of the nominal emission wavelength of the laser, and is a value which is too high for channels spaced according to the ITU grid. The described device is therefore necessary for the stabilization of the emission signal.

According to the present invention, in a layout such as that shown in FIG. 9, the signal to be stabilized can advantageously be extracted directly at the output of the laser to a polarization maintaining fibre without the necessity of using a coupler whose fibres are both of the polarization maintaining type.

What is claimed is:

1. Method for producing a fused coupler, comprising a polarization maintaining fibre and a standard fibre, characterized in that it comprises the following stages:

reducing the cross section of the standard fibre in such a way as to obtain a propagation constant for the standard fibre which differs from a propagation constant of the polarization maintaining fibre by less than a predetermined quantity corresponding to a condition permitting coupling between the fibres;

bringing the two fibres into contact with each other;

tapering the two fibres together and fusing a portion of each fibre, in a region where the two fibres are in contact with each other, at a fusion temperature which is higher than a predetermined temperature, where this predetermined temperature is such as to provide an extinction ratio of at least 20 dB at the output of the polarization maintaining fibre in case of a linear polarization at the input of the polarization maintaining fibre.

2. Method according to claim 1, in which the said stage of reducing the cross section of the standard fibre comprises the stage of reducing the diameter of the said fibre.

3. Method according to claim 2, in which the said stage of reducing the standard fibre comprises the stage of tapering the said fibre by elongation.

4. Method according to claim 2, in which the said stage of reducing the standard fibre comprises the stage of reducing the diameter of the cladding while keeping that of the core unchanged.

5. Method according to claim 1, in which the said predetermined temperature is 1610° C.

6. Method according to claim 5, in which the said fusion temperature is lower than 1650° C.

7. Method according to claim 1, in which the said propagation constant for the standard fibre differs from the propagation constant of the polarization maintaining fibre by less than a predetermined quantity corresponding to a coupling ratio of 1%.

8. Fused optical coupler comprising a polarization maintaining fibre and a standard fibre, characterized in that the cross section of the said standard fibre is smaller than the cross section of the polarization maintaining fibre in the area of fusion of the coupler in such a way as to obtain a propagation constant for the standard fibre which differs from a propagation constant of the polarization maintaining fibre by less than a predetermined quantity corresponding to a condition permitting coupling between the fibres, and the internal forces in the coupling area are sufficiently low to provide an extinction ratio of more than 20 dB at the output of the polarization maintaining fibre in case of a linear polarization at the input of the polarization maintaining fibre.

9. Fused optical coupler according to claim 8, in which the cross section of the said standard fibre is at least 15% smaller than the cross section of the said polarization maintaining fibre.

10. Fused optical coupler according to claim 9, in which the cross section of the said standard fibre is at least 20% smaller than the cross section of the said polarization maintaining fibre.

* * * * *